(12) United States Patent
Ogawa et al.

(10) Patent No.: US 11,198,471 B2
(45) Date of Patent: Dec. 14, 2021

(54) VEHICLE CONTROL METHOD AND SYSTEM

(71) Applicant: MAZDA MOTOR CORPORATION, Hiroshima (JP)

(72) Inventors: Daisaku Ogawa, Hiroshima (JP); Daisuke Umetsu, Hiroshima (JP); Fuminori Kato, Higashihiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 286 days.

(21) Appl. No.: 16/439,183

(22) Filed: Jun. 12, 2019

(65) Prior Publication Data
US 2019/0389510 A1 Dec. 26, 2019

(30) Foreign Application Priority Data

Jun. 22, 2018 (JP) .............................. JP2018-118652

(51) Int. Cl.
| | | |
|---|---|---|
| *B62D 6/10* | (2006.01) | |
| *B60W 30/14* | (2006.01) | |
| *B60W 30/182* | (2020.01) | |
| *B60W 30/18* | (2012.01) | |

(52) U.S. Cl.
CPC ............. *B62D 6/10* (2013.01); *B60W 30/143* (2013.01); *B60W 30/182* (2013.01); *B60W 30/18172* (2013.01); *B60W 2540/10* (2013.01)

(58) Field of Classification Search
CPC ..... B62D 6/10; B60W 30/143; B60W 30/182; B60W 30/18172; B60W 2540/10; B60W 2710/083; B60W 2540/106; B60W 2710/0666; B60W 2540/215; B60W 2540/18; B60W 30/18145; B60W 30/045; B60W 30/18; B60W 2520/10
See application file for complete search history.

(56) References Cited

U.S. PATENT DOCUMENTS

| | | | |
|---|---|---|---|
| 2005/0107940 A1* | 5/2005 | Higuchi ............. | B60W 30/045 701/72 |
| 2012/0179349 A1 | 7/2012 | Yamakado et al. | |
| 2014/0222309 A1 | 8/2014 | Yamakado et al. | |
| 2016/0236672 A1* | 8/2016 | Yanagida ............. | B60T 8/1755 |
| 2017/0129481 A1* | 5/2017 | Umetsu ................ | B60W 30/02 |

(Continued)

FOREIGN PATENT DOCUMENTS

| | | |
|---|---|---|
| JP | 5143103 B2 | 2/2013 |
| JP | 6202478 B1 | 9/2017 |

*Primary Examiner* — Joseph J Dallo
*Assistant Examiner* — Scott A Reinbold
(74) *Attorney, Agent, or Firm* — Studebaker & Brackett PC

(57) ABSTRACT

The present invention provides a method of controlling a vehicle (1) in which rear road wheels (2b) are driven. The method includes: a step of selecting a first pedal mode in which an acceleration is set based on a depression amount of an accelerator pedal, or a second pedal mode in which the acceleration and a deceleration are set; a step of setting a basic torque based on a driving state of the vehicle; a step of setting an incremental torque to allow the basic torque to be increased in accordance with an increase in steering angle; and a step of generating a torque which is determined by adding the incremental torque to the basic torque, wherein the incremental torque setting step includes setting the incremental torque to different values between when the first pedal mode is selected and when the second pedal mode is selected.

8 Claims, 8 Drawing Sheets

(56) References Cited

U.S. PATENT DOCUMENTS

| | | | |
|---|---|---|---|
| 2017/0259828 A1* | 9/2017 | Yamaoka | B60T 7/042 |
| 2018/0222523 A1* | 8/2018 | Talamonti | B62D 6/008 |
| 2019/0061739 A1 | 2/2019 | Yoshioka et al. | |

* cited by examiner

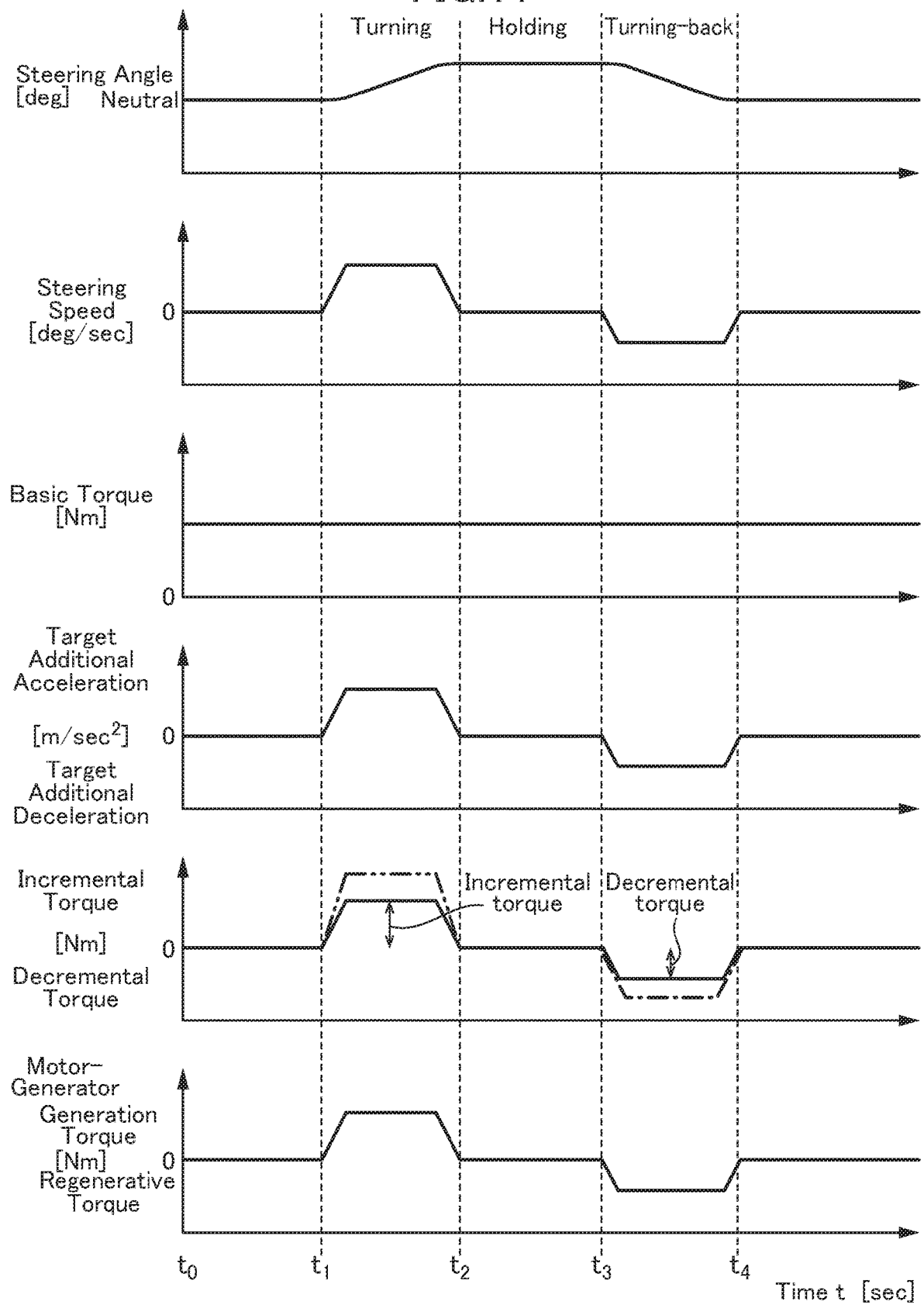

VEHICLE CONTROL METHOD AND SYSTEM

TECHNICAL FIELD

The present invention relates to a vehicle control system, and more particularly to a vehicle control system and method for controlling a vehicle in which rear road wheels are driven by a prime mover (driving source).

BACKGROUND ART

In JP 5143103B (Patent Document 1), a vehicle motion control device is described. This vehicle motion control device described in the Patent Document 1 is configured to automatically give a deceleration to a vehicle along with steering of the vehicle, thereby preventing skid of the vehicle in a marginal driving region to improve roadholding ability of the vehicle.

Further, in JP 62024781B (Parent Document 2), a vehicle behavior control device is described. This vehicle behavior control device described in the Parent Document 2 is configured to reduce a vehicle driving force based on a steering speed of a vehicle so as to add a target additional deceleration to the vehicle. In the vehicle behavior control device described in the Parent Document 2, the vehicle driving force is reduced according to the steering speed as just mentioned to increase a vertical road on front road wheels of the vehicle, thereby successfully improving responsiveness and linear feeling of vehicle behavior with respect to steering manipulation by a driver.

CITATION LIST

Parent Document

Parent Document 1: JP 5143103B
Parent Document 2: JP 6202478B

SUMMARY OF INVENTION

Technical Problem

The present inventor tried to apply, to a rear-wheel-drive vehicle, the control of giving a deceleration to a vehicle along with steering of the vehicle, as described in the Patent Documents 1 and 2. As a result, however, effects achieved in the inventions described in the Patent Documents 1 and 2, such as improvement in roadholding ability and improvement in responsiveness and linear feeling of vehicle behavior, could not be obtained.

Specifically, as vehicle attitude control, the present inventor applied, to a rear-wheel-drive vehicle, the control of giving a deceleration to a vehicle along with steering of the vehicle, as described in, e.g., the Patent Documents 1 and 2. However, when such a heretofore-known vehicle attitude control was applied to the rear-wheel-drive vehicle, the effects achieved in a front-wheel-drive vehicle, such as improvement in the responsiveness and linear feeling of the vehicle behavior, could not be obtained. The present inventor diligently conducted researches to solve this newly discovered problem. As a result, it was surprisingly revealed that, in the rear-wheel-drive vehicle, the responsiveness and linear feeling of the vehicle behavior is improved by increasingly the vehicle driving force according to steering manipulation by a driver.

Generally, it has been considered that when a deceleration is given to the vehicle, an inertial force acts on the center of gravity of the vehicle, and thereby the vehicle undergoes a pitching motion causing a front end of the vehicle to be sunk, so that a load on front road wheels as steerable road wheels is increased and thus the responsiveness with respect to steering manipulation is improved. However, in the rear-wheel-drive vehicle, when a driving torque for rear road Wheels is reduced to give a deceleration to the vehicle, a force is instantaneously transmitted from the rear road wheels to a vehicle body via a suspension such that it causes the vehicle body to be tilted rearwardly (causes a rear end of the vehicle body to be sunk). This instantaneous force acts to reduce the load on front road wheels. This is considered to be the reason that, in the rear-wheel-drive vehicle, even if a deceleration is given to the vehicle according to steering manipulation by a driver, the responsiveness and linear feeling of the vehicle behavior could not be improved as expected.

In the rear-wheel-drive vehicle, it is conceivable that, when the driving torque for the rear road wheels is increased conversely, a force is instantaneously transmitted from the rear road wheels to the vehicle body via a suspension such that it causes the vehicle body to be tilted forwardly (cause a front end of the vehicle body to be sunk), and thereby the responsiveness and linear feeling of the vehicle behavior is improved. That is, in the rear-wheel-drive vehicle, when the driving torque for the rear road wheels is increased to give an acceleration to the vehicle, an inertial force causing the vehicle body to be tilted rearwardly and an instantaneous force causing the vehicle body to be tilted forwardly are generated. However, the instantaneous force causing the vehicle body to be tilted forwardly is deemed to dominantly contribute to the responsiveness and linear feeling of the vehicle behavior with respect to the steering manipulation.

The present inventor found that, by setting an incremental torque to increase a basic torque, in accordance with an increase in steering angle of a steering device equipped in the rear-wheel-drive vehicle, the load on the front road wheels can be increased by the above instantaneous force, thereby improving the responsiveness and linear feeling of the vehicle behavior with respect to the steering manipulation.

Meanwhile, in recent years, there has been proposed a vehicle capable of perform both acceleration and deceleration of the vehicle by manipulation of a single pedal. Here, the vehicle attitude control for improving the responsiveness and linear feeling of the vehicle behavior is based on a vehicle configured such that an accelerator is manipulated during starting/acceleration of the vehicle, and a brake pedal is manipulated during deceleration/stopping of the vehicle. For this reason, when the vehicle attitude control is applied to the recently-proposed vehicle configured to perform the acceleration and deceleration of the vehicle by manipulation of a single pedal, the incremental torque is likely to become unable to be adequately set.

It is therefore an object of the present invention to provide a vehicle control system and method capable of, even when controlling a vehicle in which rear road wheels are driven by a prime mover, improving responsiveness or linear feeling of vehicle behavior with respect to steering manipulation.

Solution to Technical Problem

In order to solve the above problem, according to one aspect of the present invention, there is provided a method of controlling a vehicle in which rear road wheels are driven by a prime mover. This vehicle control method comprises: a mode selection step of selecting a first pedal mode in which an acceleration of the vehicle is set based on a depression amount of an accelerator pedal of the vehicle, or a second pedal mode in which the acceleration and a deceleration of the vehicle are set based on the depression amount of the accelerator pedal of the vehicle; a basic torque setting step of setting, based on a driving state of the vehicle, a basic torque to be generated by the prime mover; an incremental torque setting step of setting an incremental torque to allow the basic torque to be increased in accordance with an increase in steering angle of a steering device equipped in the vehicle; and a torque generation step of controlling the prime mover to generate a torque which is determined by adding the incremental torque to the basic torque, wherein the incremental torque setting step includes setting the incremental torque to different values between when the first pedal mode is selected in the mode selection step and when the second pedal mode is selected in the mode selection step.

The vehicle control method of the present invention having the above feature comprises the mode selection step of selecting the first pedal mode or the second pedal mode, wherein the incremental torque setting step includes setting the incremental torque to different values between when the first pedal mode is selected and when the second pedal mode is selected. Thus, the incremental torque can be adequately set in both the first pedal mode in which the acceleration of the vehicle is set based on the depression amount of the accelerator pedal of the vehicle, and the second pedal mode in which the acceleration and the deceleration of the vehicle are set based on the depression amount of the accelerator pedal of the vehicle.

Preferably, in the vehicle control method of the present invention, the incremental torque setting step includes setting the incremental torque to a larger value when the second pedal mode is selected in the mode selection step than when the first pedal mode is selected in the mode selection step.

Typically, in the first pedal mode, almost the entire movable range of the accelerator pedal is assigned to the acceleration of the vehicle, whereas, in the second pedal mode, a part of the movable range in which the depression amount of the accelerator pedal is relatively small is assigned to the deceleration of the vehicle, and the remaining part of the movable range in which the depression amount of the accelerator pedal is relatively large is assigned to the acceleration of the vehicle. For this reason, in a state in which the accelerator pedal is depressed by the same amount, the acceleration given to the vehicle becomes smaller in the second pedal mode than in the first pedal mode. Thus, in the second pedal mode, a load acting on front road wheels as steerable road wheels becomes relative large as compared to in the first pedal mode, so that a suspension supporting the front road wheels is relatively compressed to have relatively high rigidity. As a result, the effect of improving the responsiveness and linear feeling of the vehicle behavior by adding the incremental torque becomes deteriorated in the second pedal mode, as compared to in the first pedal mode.

However, according to the above feature, the incremental torque is set to a larger value when the second pedal mode is selected in the mode selection step than when the first pedal mode is selected in the mode selection step, so that it becomes possible to sufficiently obtain the effect of improving the responsiveness and linear feeling of the vehicle behavior by adding the incremental torque, even in the second pedal mode.

Preferably, in the vehicle control method of the present invention, the incremental torque setting step includes, under a condition that the second pedal mode is selected in the mode selection step, setting the incremental torque to a larger value when the depression amount of the accelerator pedal of the vehicle is relatively small than when the depression amount of the accelerator pedal of the vehicle is relatively large.

Typically, the acceleration of the vehicle becomes smaller when the depression amount of the accelerator pedal of the vehicle is relatively small than when the depression amount of the accelerator pedal of the vehicle is relatively large. Thus, when the depression amount of the accelerator pedal is relatively small, the load acting on the front road wheels becomes relatively large, so that the suspension supporting the front road wheels is relatively compressed to have relatively high rigidity. As a result, the effect of improving the responsiveness and linear feeling of the vehicle behavior by adding the incremental torque becomes deteriorated when the depression amount of the accelerator pedal is relatively small.

However, according to the above feature, the incremental torque is set to a larger value when the depression amount of the accelerator pedal of the vehicle is relatively small than when the depression amount of the accelerator pedal of the vehicle is relatively large, so that it becomes possible to sufficiently improve the responsiveness and linear feeling of the vehicle behavior, even when the depression amount is relatively small.

Preferably, in the vehicle control method of the present invention, the incremental torque setting step includes, under a condition that the second pedal mode is selected in the mode selection step, setting the incremental torque to a smaller value when a manipulation speed during depression of the accelerator pedal of the vehicle is relatively large than when the manipulation speed during depression of the accelerator pedal of the vehicle is relatively small.

Typically, the acceleration given to the vehicle becomes larger when the accelerator pedal of the vehicle is depressed at a relatively large manipulation speed than when the accelerator pedal of the vehicle is depressed at a relatively small manipulation speed. Thus, when the accelerator pedal is depressed at a relatively large manipulation speed, the load acting on the front road wheels becomes relatively small, so that the suspension supporting the front road wheels is relatively stretched to have relatively low rigidity. As a result, the effect of improving the responsiveness and linear feeling of the vehicle behavior by adding the incremental torque becomes enhanced when the accelerator pedal is depressed at a relatively large manipulation speed.

However, according to the above feature, the incremental torque is set to a smaller value when the manipulation speed during depression of the accelerator pedal is relatively large than when the manipulation speed during depression of the accelerator pedal is relatively small, so that it becomes possible to prevent cornering performance of the vehicle from becoming excessive even when the accelerator pedal is depressed at a relatively large manipulation speed.

Preferably, in the vehicle control method of the present invention, the incremental torque setting step includes, under a condition that the second pedal mode is selected in the mode selection step, setting the incremental torque to a larger value when a manipulation speed during return of the accelerator pedal of the vehicle is relatively large than when the manipulation speed during return of the accelerator pedal of the vehicle is relatively small.

Typically, the deceleration given to the vehicle becomes larger when the accelerator pedal of the vehicle is returned at a relatively large manipulation speed than when the accelerator pedal of the vehicle is returned at a relatively small manipulation speed. Thus, when the accelerator pedal is returned at a relatively large manipulation speed, the load acting on the front road wheels becomes relatively large, so that the suspension supporting the front road wheels is relatively compressed to have relatively high rigidity. As a result, the effect of improving the responsiveness and linear feeling of the vehicle behavior by adding the incremental torque becomes deteriorated when the accelerator pedal is returned at a relatively large manipulation speed.

However, according to the above feature, the incremental torque is set to a larger value when the manipulation speed during return of the accelerator pedal is relatively large than when the manipulation speed during return of the accelerator pedal is relatively small, so that it becomes possible to sufficiently improve the responsiveness and linear feeling of the vehicle behavior even when the manipulation speed during return of the accelerator pedal is relatively large.

Preferably, the vehicle control method of the present invention further comprises: a decremental torque setting step of setting a decremental torque to allow the basic torque to be reduced in accordance with a decrease in the steering angle of the steering device equipped in the vehicle; and a second torque generation step of controlling the prime mover to generate a torque which is determined by subtracting the decremental torque from the basic torque, wherein the decremental torque setting step includes setting the incremental torque to different values between when the first pedal mode is selected in the mode selection step and when the second pedal mode is selected in the mode selection step.

According to this feature, in the decremental torque setting step, the decremental torque is set to allow the basic torque to be reduced in accordance with the decrease in the steering angle of the steering device equipped in the vehicle. In the rear-wheel-drive vehicle, when the driving torque for the rear road wheels is reduced, a force is instantaneously transmitted from the rear road wheels to a vehicle body via the suspension such that it causes the vehicle body to be tilted rearwardly (causes a rear end of the vehicle body to be sunk). In this way, by reducing the load on the steerable road wheels during turning-back of a steering wheel (during the decrease in the steering angle), it becomes possible to allow the vehicle to be shifted from a cornering state to a straight-ahead traveling state, and improve the responsiveness of the vehicle behavior with respect to turning-back of the steering wheel.

However, when this vehicle attitude control is applied to a vehicle configured to perform the acceleration and deceleration of the vehicle by manipulation of a single pedal, the decremental torque is likely to become unable to be adequately set. In this regard, in the decremental torque setting step, the decremental torque is set to different values between when the first pedal mode is selected and when the second pedal mode is selected. Thus, the decremental torque can be adequately set in both the first pedal mode in which the acceleration of the vehicle is set based on the depression amount of the accelerator pedal of the vehicle, and the second pedal mode in which the acceleration and the deceleration of the vehicle are set based on the depression amount of the accelerator pedal of the vehicle.

Preferably, in the vehicle control method of the present invention, the decremental torque setting step includes setting the decremental torque to a larger value when the second pedal mode is selected in the mode selection step than when the first pedal mode is selected in the mode selection step.

As mentioned above, in the state in which the accelerator pedal is depressed by the same amount, the acceleration given to the vehicle becomes smaller in the second pedal mode than in the first pedal mode. Thus, in the second pedal mode, the load acting on the front road wheels as steerable road wheels becomes relatively larger as compared to in the first pedal mode, so that the suspension supporting the front road wheels is relatively compressed to have relatively high rigidity. As a result, the effect of improving the responsiveness and linear feeling of the vehicle behavior by subtracting the decremental torque becomes deteriorated in the second pedal mode as compared to in the first pedal mode.

However, according to the above feature, the decremental torque is set to a larger value when the second pedal mode is selected in the mode selection step than when the first pedal mode is selected in the mode selection step, so that it becomes possible to sufficiently obtain the effect of improving the responsiveness and linear feeling of the vehicle behavior by subtracting the decremental torque, even in the second pedal mode.

According to another aspect of the present invention, there is provided a vehicle control system for controlling a vehicle in which rear road wheels are driven by a prime mover. The vehicle control system comprises: a mode selector for selecting a first pedal mode in which an acceleration of the vehicle is set based on a depression amount of an accelerator pedal of the vehicle, or a second pedal mode in which the acceleration and a deceleration of the vehicle are set based on the depression amount of the accelerator pedal of the vehicle; a driving state sensor for detecting a driving state of the vehicle; a steering angle sensor for detecting a steering angle of a steering device equipped in the vehicle; and a controller for controlling the prime mover based on a detection signal from the driving state sensor and a detection signal from the steering angle sensor, wherein the controller is configured to: set, based on the detection signal from the driving state sensor, a basic torque to be generated by the prime mover; when an increase in the steering angle is detected by the steering angle sensor, set an incremental torque to allow the basic torque to be increased in accordance with the increase in the steering angle; and control the prime mover to generate a torque which is determined by adding the incremental torque to the basic torque, wherein the controller is operable to set the incremental torque to different values between when the first pedal mode is selected by the mode selector and when the second pedal mode is selected by the mode selector.

Effect of Invention

Even when controlling the vehicle in which the rear road wheels are driven by the prime mover, the vehicle control system and method of the present invention can improve the responsiveness or linear feeling of the vehicle behavior with respect to the steering manipulation.

BRIEF DESCRIPTION OF DRAWINGS

FIG. 11 is a diagram of time charts showing one example of operation of the vehicle control system according to this embodiment.

DESCRIPTION OF EMBODIMENTS

With reference to the accompanying drawings, a preferred embodiment of the present invention will now be described.

Figure 1:
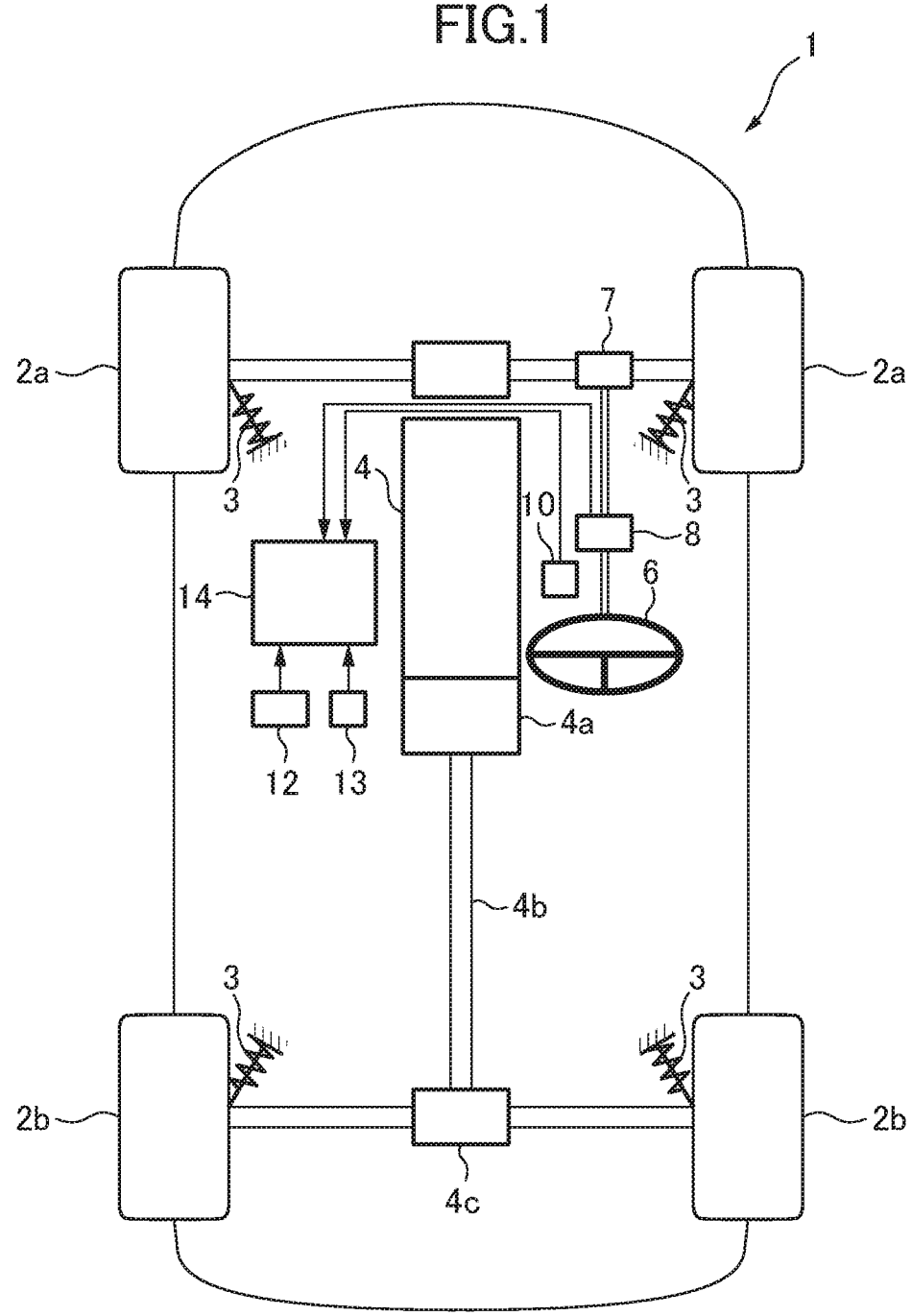
FIG. 1 is a block diagram depicting an overall configuration of a vehicle equipped with a vehicle control system according to one embodiment of the present invention.

First of all, with reference to FIG. 1, a vehicle system according to one embodiment of the present invention will be described. FIG. 1 is a block diagram depicting an overall configuration of a vehicle equipped with a vehicle control system according to this embodiment.

In FIG. 1, the reference sign 1 denotes a vehicle in the vehicle control system according to this embodiment.

In the vehicle 1, right and left front road wheels 2a as steerable road wheels are provided in a front portion of a vehicle body thereof, and right and left rear road wheels 2b as drive road wheels are provided in a rear portion of the vehicle body. Each of the front and rear road wheels 2a, 2b of the vehicle 1 is supported by a suspension 3 with respect to the vehicle body. Further, the vehicle 1 is equipped with an engine 4 in the front portion of the vehicle body, wherein the engine 4 serves as a prime mover for driving the rear road wheels 2b. In this embodiment, the engine 4 is a gasoline engine. Alternatively, an different type of internal combustion engine such as a diesel engine, or a motor configured to be driven by electric power, may be used as the prime mover. Further, in this embodiment, the vehicle 1 is a so-called FR vehicle in which the rear road wheels 2b are driven by the engine 4 mounted to the front portion of the vehicle body via a transmission 4a, a propeller shaft 4b and a differential gear unit 4c. However, the present invention can be applied to any other type of vehicle in which rear road wheels are driven by a prime mover, such as a so-called RR vehicle in which the rear road wheels 2b are driven by an engine mounted to the rear portion of the vehicle body.

Further, the vehicle 1 is equipped with a steering device 7 for steering the front road wheels 2a in accordance with turning/turning-back manipulation of a steering wheel 6.

Further, the vehicle 1 has: a steering angle sensor 8 for detecting a turning angle of the steering wheel 6 (steering angle); an accelerator position sensor 10 serving as a driving state sensor for detecting a depression amount (relative position) of an accelerator pedal; and a vehicle speed sensor 12 for detecting a vehicle speed. Each of the above sensors is operable to output a detection value thereof to a PCM (Powertrain Control Module) 14. The vehicle control system according to this embodiment comprises the steering angle sensor 8, the accelerator position sensor 10, the vehicle speed sensor 40, and the PCM 14.

Further, the vehicle 1 is equipped with a motor-generator 9a having a function of driving the rear road wheels 2b (i.e., function as a prime mover) and a function of generating regenerative electric power while being driven by the rear road wheels 2b (i.e., function as a generator) to serve as a prime mover. The motor-generator 9a is disposed such that a driving force therefrom is transmitted to the rear road wheels 2b via the transmission 4a, and configured to be controlled by the PCM 14 via an inverter 9b. Further, the motor-generator 9a is connected to a battery 9c, and configured to be supplied with electric power from the battery 9c when it is generating a driving force, and to supply electric power to the battery 9c to charge the battery 9c during a generative event.

Further, in this embodiment, the vehicle 1 is configured to be capable of selecting a normal pedal mode, i.e., a first pedal mode in which an acceleration of the vehicle 1 is set based on the depression amount of the accelerator, or a single pedal mode. i.e., a second pedal mode in which both the acceleration and a deceleration of the vehicle 1 are set based on the depression amount of the accelerator pedal. Specifically, the vehicle 1 is provided with a mode selector 13 for selecting the normal pedal mode or the single pedal mode.

Figure 2:
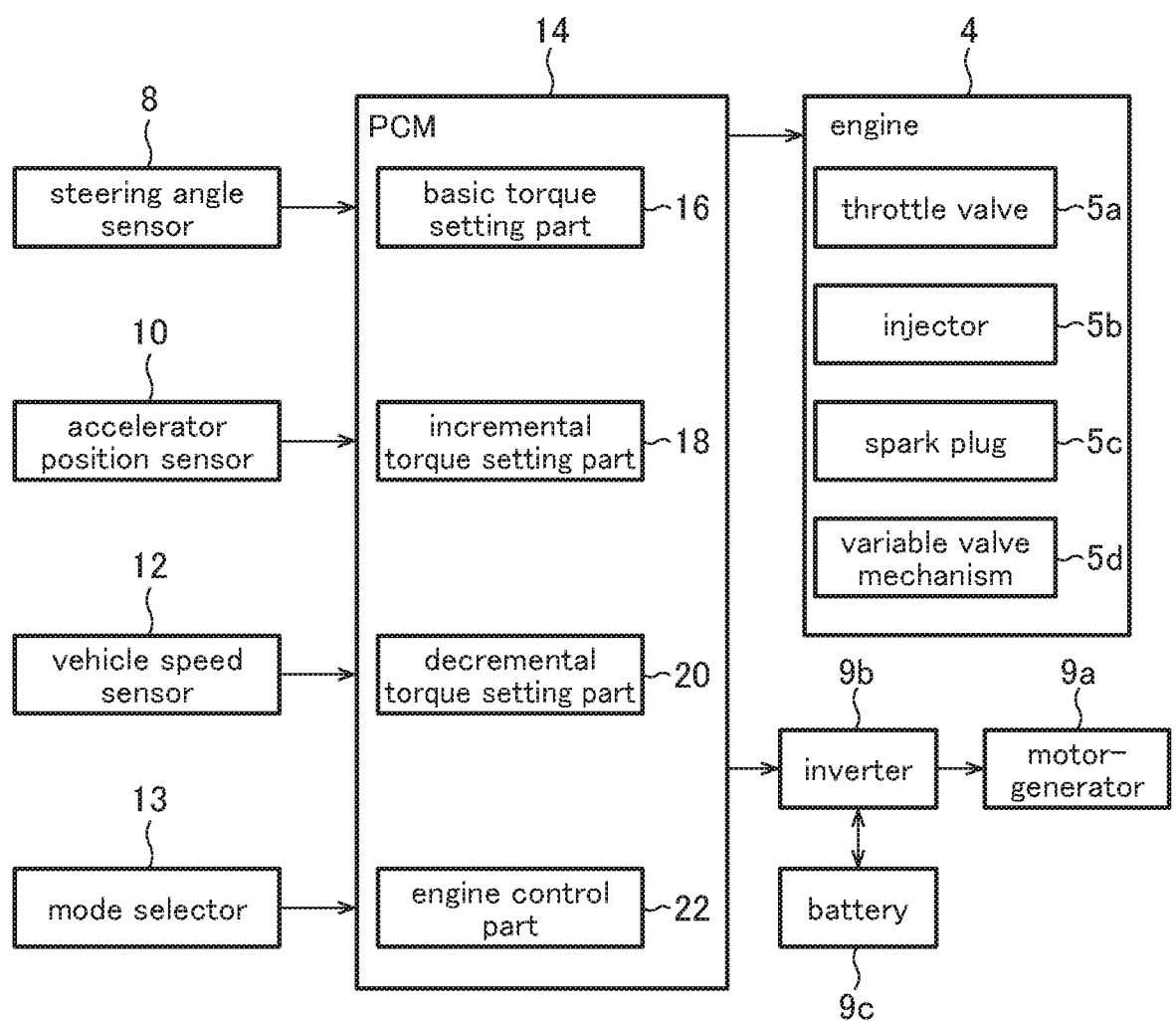
FIG. 2 is a block diagram depicting an electrical configuration of the vehicle control system according to this embodiment.

Next, with reference to FIG. 2, an electrical configuration of the vehicle control system according to this embodiment will be described. FIG. 2 is a block diagram depicting the electrical configuration of the vehicle control system according to this embodiment.

The PCM 8 is configured to output, based on the detection signals of the aforementioned sensors 8 to 12 and detection signals output by various other sensors for detecting an operating state of the engine 4, control signals to perform control with respect to various components (such as a throttle valve 5a, an injector (fuel injection valve) 5b, a spark plug 5c, a variable valve mechanism 5d, etc.) of the engine 4, and the motor-generator 9a. Further, the PCM 14 is configured to accept an input signal indicative of which of the normal pedal mode and the single pedal mode is selected by the mode selector 13.

The PCM 14 comprises a basic torque setting part 16, an incremental torque setting part 18, a decremental torque setting part 20, and an engine control part 22. The basic torque setting part 16 is configured to set, based on the detection signal of the accelerator position sensor 10 as a driving state sensor, a basic torque to be generated by the engine 4. The incremental torque setting part 18 is configured to set an incremental torque to allow the basic torque to be increased, when an increase in the steering angle is detected by the steering angle sensor 8. The decremental torque setting part 20 is configured to set a decremental torque to allow the basic torque to be reduced when a decrease in the steering angle is detected by the steering angle sensor 8. The engine control part 22 is configured to control the engine 4 to generate a torque which is determined by adding the incremental torque to the basic torque or a torque which is determined by subtracting the decremental torque from the basic torque.

The parts or elements of the PCM 14 are composed of a computer which comprises: one or more CPUs; various programs (including a basic control program such as an OS, and an application program capable of being activated on the OS to realize a specific function) to be interpreted and executed by the one or more CPUs; and an internal memory such as ROM or RAM for storing therein the programs and a variety of data.

In addition to the accelerator position sensor 10, the vehicle speed sensor 12, etc., the system may further comprises a brake sensor, an engine speed sensor and the like as a driving state sensor, although they are not depicted in FIG. 2. The engine control part 22 is configured to control the fuel injection valve 5b, the spark plug 5c, the throttle valve 5a, the variable valve mechanism 5d, etc., of the engine 4 to control the torque to be generated by the engine 4.

Next, with reference to FIGS. 3 to 9, a vehicle control method to be is executed by the vehicle control system according to this embodiment will be described.

Figure 3:
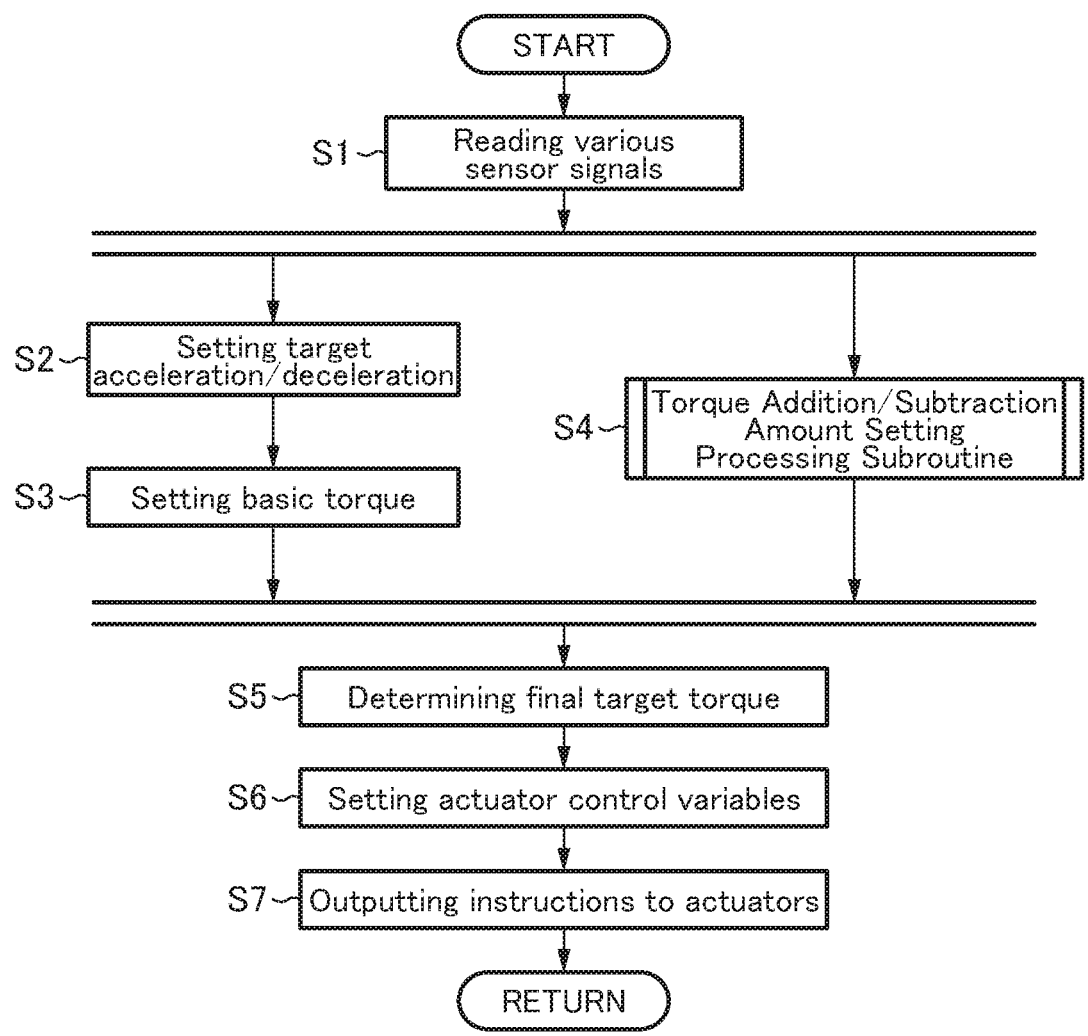
FIG. 3 is a flowchart of an engine control processing routine to be executed by a PCM comprised in the vehicle system according to this embodiment to control an engine.

FIG. 3 is a flowchart of an engine control processing routine to be executed by the PCM 14 comprised in the vehicle system according to this embodiment to control the engine 4.

The engine control processing routine in FIG. 3 is activated when an ignition switch of the vehicle 1 is turned on to apply electric power to the vehicle control system, and repeatedly executed.

As depicted in FIG. 3, upon start of the engine control processing routine, the PCM 14 operates, in step S1, to read and acquire various sensor signals regarding the driving state of the vehicle 1. Specifically, the PCM 14 operates to acquire, as information regarding the driving state, detection signals output from the aforementioned various sensors, including: the steering angle detected by the steering angle sensor 8; the accelerator position detected by the accelerator position sensor 10; the vehicle speed detected by the vehicle speed sensor 12; and a transmission speed stage currently set in the transmission 4a of the vehicle 1. The PCM 14 also operates to acquire information regarding a selected state of the normal pedal mode or the single pedal mode by the mode selector 13.

Subsequently, in step S2, the PCM 14 operates to set a target acceleration/deceleration, based on the driving state of the vehicle 1 including the accelerator position (manipulated state of the accelerator pedal) and the vehicle speed acquired in the step S1. Specifically, the basic torque setting part 16 operates to select, from among a plurality of acceleration characteristic maps each defining a relationship between acceleration and accelerator position, with respect to various vehicle speeds, various transmission speed stages and the accelerator pedal modes (the maps are preliminarily created and stored in a memory or the like) one acceleration characteristic map corresponding to current values or states of the vehicle speed, the transmission speed stage and the accelerator pedal mode, and refer to the selected acceleration characteristic map to determine, as a target acceleration/deceleration, an acceleration corresponding to a current value of the accelerator position.

Subsequently, in step S3, the basic torque setting part 16 operates to determine the basic torque to be generated or regenerated by a prime mover (i.e., a torque to be generated by the engine 4 and a torque to be generated or regenerated by the motor-generator 9a) so as to realize the target acceleration/deceleration determined in the step S2. That is, the basic torque setting part 16 operates to execute, as a basic torque setting step, a step of determining, based on the driving state of the vehicle 1, the basic torque to be generated or regenerated by the engine 4 and the motor-generator 9a each serving as a prime mover. In this case, the basic torque setting part 16 operates to determine the basic torque within a torque range output table by the engine 4 and the motor-generator 9a, based on current values or states of the vehicle speed, the transmission speed stage, road grade, road surface μ, etc.

In parallel with the processings in the steps S2 and S3, in step S4, the incremental torque setting part 18 and the decremental torque setting part 20 operate to execute a torque addition/subtraction amount setting processing subroutine for determining a torque for adding an acceleration or a deceleration to the vehicle 1, in accordance with steering manipulation. That is, in the step S4, an incremental torque setting step of setting the incremental torque to allow the basic torque to be increased in accordance with an increase in the steering angle of the steering device 7 and a decremental torque setting step of setting the decremental torque to allow the basic torque to be increased in accordance with a decrease in the steering angle of the steering device 7 are executed. This torque addition/subtraction amount setting processing subroutine will be described later with reference to FIG. 4.

After executing the processings in the steps S2 and S3, the torque addition/subtraction amount setting processing subroutine in the step S4, a final target torque is determined, in step S5, by adding or subtracting the incremental or decremental torque determined in the step S4 to or from the basic torque determined in the step S3. Here, the basic torque is a torque to be set according to driving manipulation by a driver, such as manipulation of the accelerator, whereas the incremental or decremental torque is a torque to be automatically added or reduced by the PCM 14 so as to enable the vehicle 1 to exhibit behavior closer to driver's intention.

Subsequently, in step S6, the PCM 14 operates to set actuator control variables so as to realize the final target torque set in the step S5. Specifically, the PCM 14 operates to determine various state amounts necessary to realize the final target torque, based on the final target torque set in the step S5, and set respective control variables of actuators for driving components of the engine 4 and the motor-generator 9a, based on the determined state amounts. In this case, the PCM 14 operates to set a limit value or range with respect to each of the state amounts, and set a control variable of each actuator to allow its related state amount to preserve limitation by the limit value or range.

Then, in step S7, the PCM 14 operates to output control instructions to the actuators, based on the control variables set in the step S6.

For example, assuming that the engine 4 is a gasoline engine, when setting, in the step S5, the final target torque by adding the incremental torque to the basic torque, the PCM 14 operates to advance an ignition timing of the spark plug 5c with respect to a point for generating the basic torque. Alternatively, in place of or in addition to the advance of the ignition timing, the PCM 14 may be configured to increase an intake air amount by increasing an opening angle of the throttle valve, or by advancing a closing timing of an intake valve set after bottom dead center. In this case, the PCM 14 operates to increase a fuel injection amount of the injector 5b in proportion to the increase in the intake air amount, such that a given air-fuel ratio is maintained.

On the other hand, when setting, in the step S5, the final target torque by subtracting the decremental torque from the basic torque, the PCM 14 operates to retard the ignition timing of the spark plug 5c with respect to the point for generating the basic torque. Alternatively, in place of or in addition to the retard of the ignition timing, the PCM 14 may be configured to reduce the intake air amount by reducing the opening angle of the throttle valve, or retarding the closing timing of the intake valve set after bottom dead center. In this case, the PCM 14 operates to reduce the fuel injection amount of the injector 5b in proportion to the decrease in the intake air amount, such that a given air-fuel ratio is maintained.

Further, assuming that the engine 4 is a diesel engine, when setting, in the step S5, the final target torque by adding the incremental torque to the basic torque, the PCM 14 operates to increase the fuel injection amount of the injector 5b with respect to a value for generating the basic torque. On the other hand, when setting, in the step S5, the final target torque by subtracting the decremental torque from the basic torque, the PCM 14 operates to reduce the fuel injection amount of the injector 5b with respect to the value for generating the basic torque.

Alternatively, in place of or in addition to the above control of the engine 4, the PCM 14 may be configured to control the motor-generator 9a to realize the final target torque set in the step S5. Specifically, when setting, in the step S5, the final target torque by adding the incremental torque to the basic torque, the PCM 14 operates to set an inverter instruction value (control signal) such that a torque to be generated by the motor-generator 9a is increased, and output the inverter instruction value to the inverter 9b. On the other hand, when, in the step S5, the basic torque has a negative value or the final target torque set by subtracting the decremental torque from the basic torque has a negative value, the PCM 14 operates to set the inverter instruction value (control signal) such that the motor-generator 9a performs regenerative power generation to generate a regeneration torque, and output the inverter instruction value to the inverter 9b.

After the step S7, the PCM 14 completes one cycle of the engine control processing routine according to the flowchart depicted in FIG. 3.

Next, with respect to FIGS. 4 to 9, the torque addition/subtraction amount setting processing subroutine to be executed in the step S4 in FIG. 3 will be described.

Figure 4:
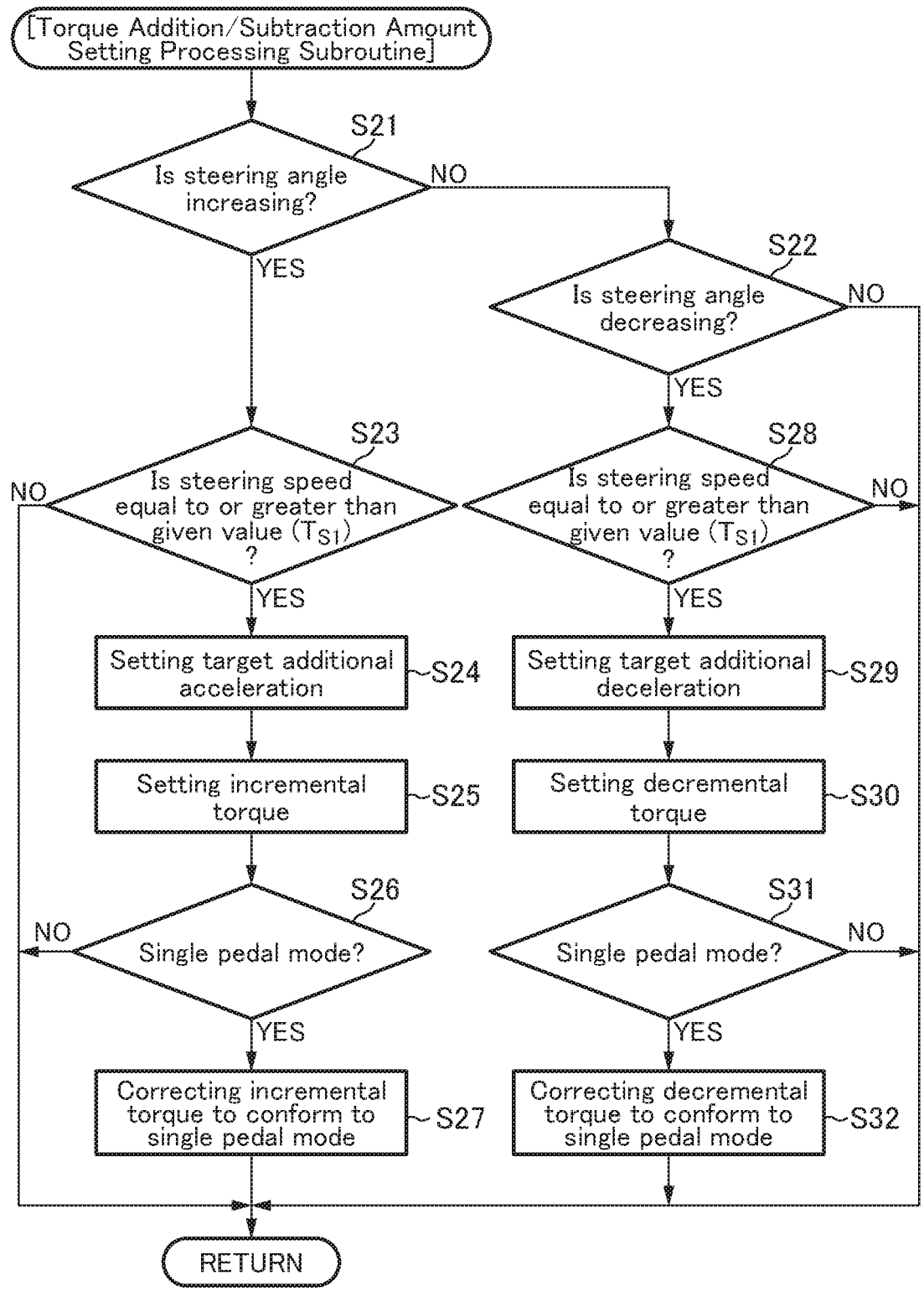
FIG. 4 is a flowchart of a torque addition/subtraction amount setting processing subroutine to be executed by the PCM in this embodiment to determine an incremental torque.
Figure 5:
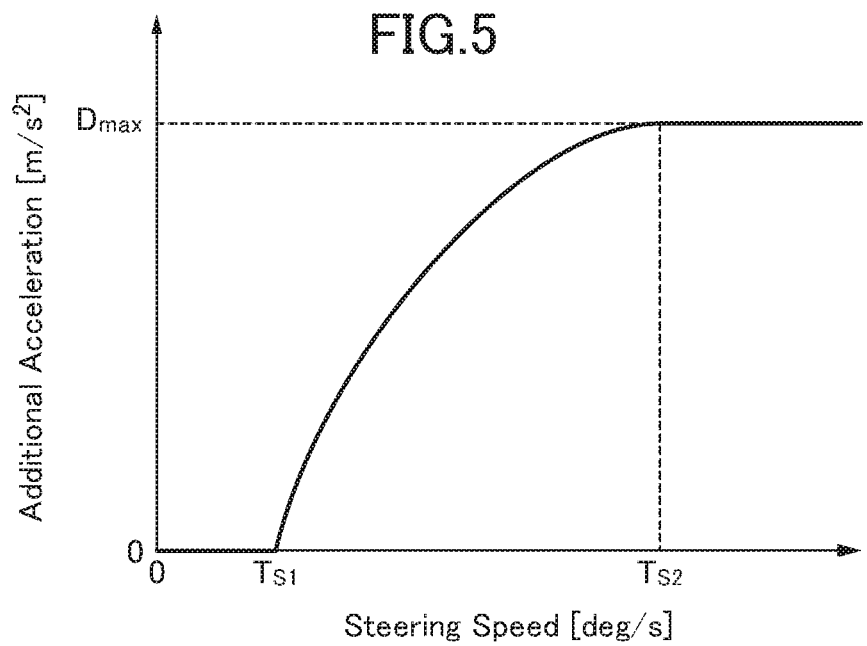
FIG. 5 is a map representing a relationship between a steering speed and an additional acceleration to be determined as a target additional acceleration by the PCM in this embodiment.
Figure 6:
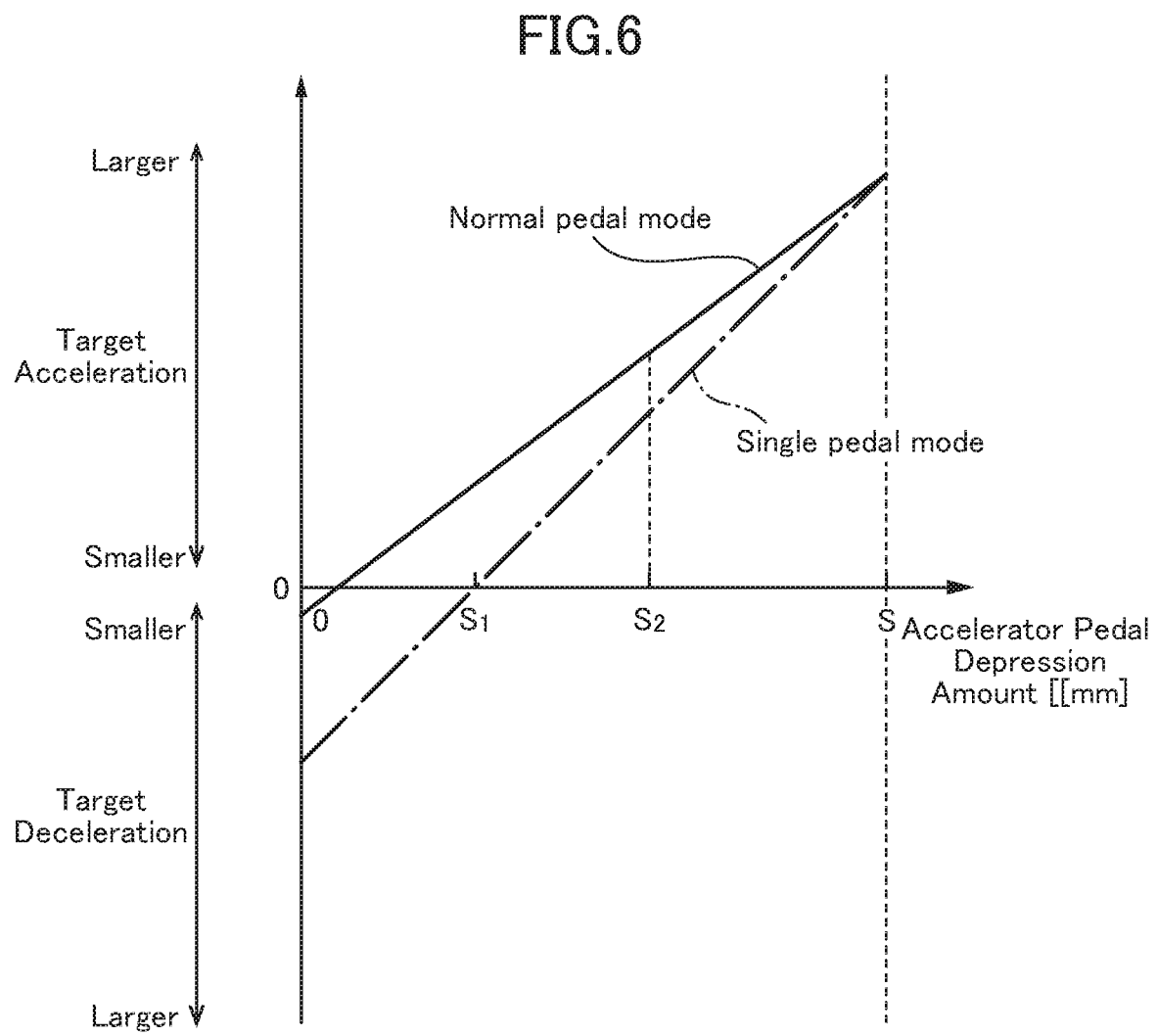
FIG. 6 is a graph representing a relationship between an accelerator pedal depression amount and a target acceleration/target deceleration in a normal pedal mode and a single pedal mode, in this embodiment.
Figure 7:
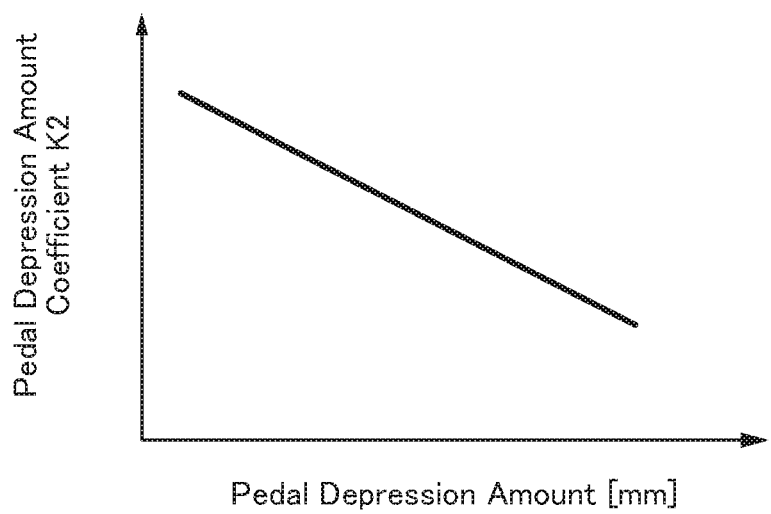
FIG. 7 is a graph representing a relationship between a pedal depression amount coefficient and the accelerator pedal depression amount, in this embodiment.
Figure 8:
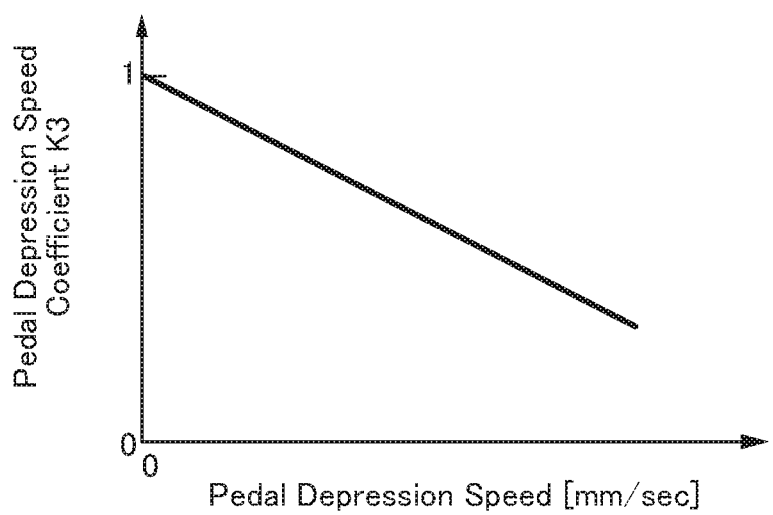
FIG. 8 is a graph representing a relationship between a pedal depression speed coefficient and an accelerator pedal depression speed, in this embodiment.
Figure 9:
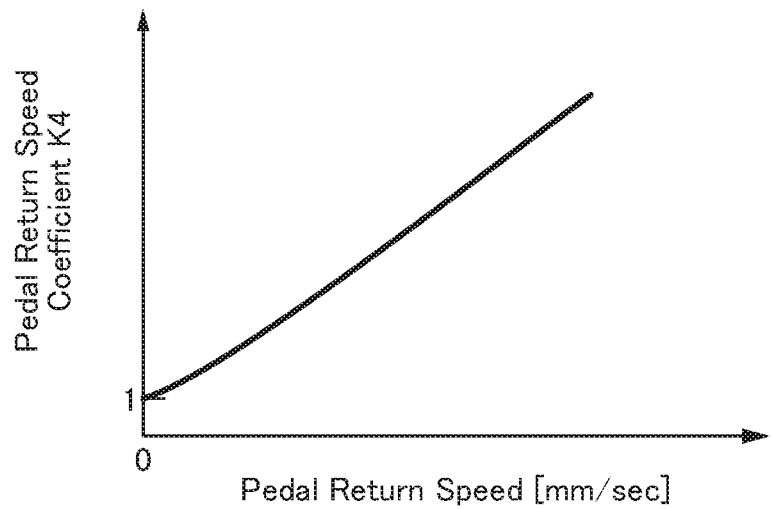
FIG. 9 is a graph representing a relationship between a pedal return speed coefficient and an accelerator pedal return speed, in this embodiment.

FIG. 4 is a flowchart of the torque addition/subtraction amount setting processing subroutine to be executed by the PCM 14 in this embodiment to determine the incremental torque, and FIG. 5 is a map representing a relationship between a steering speed and an additional acceleration to be determined as a target additional acceleration by the PCM in this embodiment. FIG. 6 is a graph representing a relationship between the accelerator pedal depression amount, and the target acceleration/target deceleration, in each of the normal pedal mode and the single pedal mode. FIG. 7 is a graph representing a relationship between a pedal depression amount coefficient K2 and the accelerator pedal depression amount. FIG. 8 is a graph representing a relationship between a pedal depression speed coefficient K3 and an accelerator pedal depression speed. FIG. 9 is a graph representing a relationship between a pedal return speed coefficient K4 and an accelerator pedal return speed.

Upon start of the torque addition/subtraction amount setting processing subroutine, the PCM 14 operates, in step S21, to determine whether or not the steering angle of the steering device 7 acquired in the step S1 in the flowchart depicted in FIG. 3 is increasing. Specifically, (the absolute value) of the steering angle is set such that it becomes zero when the vehicle 1 is traveling straight ahead, and increases when the steering wheel 6 is turned in a clockwise or counterclockwise direction. In this embodiment, the steering angle is detected by the steering angle sensor 8 installed to a steering shaft. Alternatively, the steering angle may be detected by any other suitable sensor such as a sensor for detecting an angle of each of the front road wheels 2a (steerable road wheels).

In the step S21, when (the absolute value of) the steering angle is determined not to be increasing, the subroutine proceeds to step S22. In the step S22, the PCM 14 operates to determine whether or not (the absolute value of) the steering angle is decreasing. That is, in the step S22, the PCM 14 operates to determine whether or not the turning angle of the steering wheel 6 is coming closer to a state in which the steering angle is 0. In the step S22, when the steering angle is determined not to be decreasing, the PCM 14 completes one cycle of the processing subroutine according to the flowchart in FIG. 4, and returns the processing to the main routine depicted in FIG. 3. That is, when the steering manipulation by a driver is not being performed (steering speed=0), the basic torque set in the step S3 illustrated in FIG. 3 is determined as the final target torque, without setting the incremental torque or the decremental torque.

On the other hand, when the steering angle is determined to be increasing, the subroutine proceeds to step S23. In the step S23, the PCM 14 operates to determine whether or not the steering speed is equal to or greater than a given value. Specifically, the PCM 14 operates to calculate the steering speed based on steering angles sequentially acquired in the step S1 illustrated in FIG. 3, and determine whether or not a calculated value of the steering speed is equal to or greater than a given threshold $T_{S1}$. When the steering speed is determined not to be equal to or greater than the given threshold $T_{S1}$, the PCM 14 completes one cycle of the processing subroutine according to the flowchart in FIG. 4, and returns the processing to the main routine depicted in FIG. 3. That is, when the steering speed is significantly small, it is considered that the driver is unwilling to perform the steering manipulation. Thus, in this situation, the setting of the incremental torque by the incremental torque setting part 18 is not executed. This makes it possible to prevent the torque addition amount setting processing from unnecessarily intervening in the situation where the driver is unwilling to perform the steering manipulation.

In the step S23, when the steering speed is determined to be equal to or greater than the given value, the subroutine proceeds to step S24. Specifically, when the driver turns the steering wheel 6, the processings in step S24 and the subsequent steps will be executed. In the processings in step S24 and the subsequent steps, as the incremental torque setting step, an addition amount of an output torque of the engine 4 (incremental torque) necessary to add an acceleration to the vehicle 1 is set by the incremental torque setting part 18.

In the step S24, the incremental torque setting part 18 first operates to acquire a target additional acceleration based on the steering speed. This target additional acceleration is an acceleration to be added to the vehicle 1 according to the steering manipulation, with a view to accurately realizing vehicle behavior intended by the driver.

Specifically, based on the relationship between the additional acceleration and the steering speed defined in the map in FIG. 5, the incremental torque setting part 18 operates to set, as the target additional acceleration, a value of the additional acceleration corresponding to the steering speed calculated in step S23.

In FIG. 5, the horizontal axis represents the steering speed, and the vertical axis represents the additional acceleration. As depicted in FIG. 5, when the steering speed is less than the threshold $T_{S1}$, a corresponding value of the additional acceleration is 0. That is, when the steering speed is less than the threshold $T_{S1}$, the PCM 14 operates to avoid performing control of adding an acceleration to the vehicle 1 in accordance with the steering manipulation (to return the processing to the main routine without setting the incremental torque).

On the other hand, when the steering speed is equal to or greater than the threshold $T_{S1}$, a value of the additional acceleration corresponding to this steering speed gradually comes closer to a given upper limit value $D_{max}$. That is, as the steering speed becomes higher, the additional acceleration becomes larger, and an increase rate of the additional acceleration becomes smaller. This upper limit value $D_{max}$ is set at a level (e.g., 0.5 m/s² ≈ 0.05 G) that a driver does not feel control intervention even when the acceleration is added to the vehicle 1 in response to the steering manipulation. Further, when the steering speed is equal to or greater than a threshold $T_{S2}$ greater than the threshold $T_{S1}$, the additional acceleration is maintained at the upper limit value $D_{max}$.

Subsequently, in step S25, the incremental torque setting part 18 operates to set the incremental torque which is a torque addition amount necessary to realize the target additional acceleration acquired in the step S24.

Subsequently, in step S26, as a mode selection step, the PCM 14 operates to determine whether or not the mode selector 13 provided in the vehicle 1 is set to the single pedal mode. When the mode selector 13 is determined to be set to the single pedal mode, the subroutine proceeds to step S27. On the other hand, when the mode selector 13 is determined to be set to the normal pedal mode, the PCM 14 completes one cycle of the processing subroutine according to the flowchart in FIG. 4, and returns the processing to the main routine. That is, when the mode selector 13 is set to the normal pedal mode, the final target torque is calculated by adding, in the step S5 illustrated in FIG. 3, the incremental torque set in the step S25 to the basic torque without correcting the incremental torque.

On the other hand, in the step S27, the incremental torque set in the step S25 is corrected. Specifically, in the step S27, the incremental torque set in the step S25 is corrected by being multiplied by a single pedal mode coefficient k1, a pedal depression amount coefficient K2, a pedal depression speed coefficient K3 and a pedal return speed coefficient K4.

Here, with reference to FIG. 6, the relationship between the accelerator pedal depression amount and a target acceleration/target deceleration in the normal pedal mode and the single pedal mode will be described.

As depicted in FIG. 6, the accelerator pedal equipped in the vehicle 1 is capable of being depressed from an original point where the depression amount is 0 [min] to a maximum stroke point where the depression amount has a maximum value S [mm]. Under the condition that the mode selector 13 is set to the normal pedal mode, the target deceleration is set to have a small value in a small region of the overall stroke adjacent to the original point (depression amount=0 [mm]), as indicated by the solid line in FIG. 6. In the remaining region having a larger depression amount, along with an increase in the depression amount, the target acceleration is linearly increased, and is set to a maximum value at the maximum stroke point (depression amount=S [mm]). As above, in the normal pedal mode, almost the overall stroke of the accelerator pedal is assigned to the setting of the target acceleration. Thus, in this mode, the accelerator pedal can be used to set only acceleration but substantially cannot be used to set deceleration.

On the other hand, under the condition that the mode selector 13 is set to the single pedal mode, the target deceleration is set to have a relatively large maximum value at the original point (depression amount=0 [mm]), as indicated by the one-dot chain line in FIG. 6. Then, along with an increase in the depression amount, the target deceleration is linearly reduced, and both the target acceleration and the target deceleration become zero (none of the target acceleration and the target deceleration is set) at a first stroke point (depression amount=$S_1$ [mm]). Then, when the depression amount becomes larger than $S_1$ [mm], along with an increase in the depression amount, the target acceleration is linearly increased, and is set to a maximum value at the maximum stroke point (depression amount=S [mm]). As above, in this embodiment, under the condition that the mode selector 13 is set to the single pedal mode, a region of about ¼ of the overall stroke (depression amount=0 to $S_1$ [mm]) is assigned to the setting of the target deceleration, and the remaining region (depression amount=$S_1$ to S [mm]) is assigned to the setting of the target acceleration. Thus, for example, when the depression amount is $S_2$ [mm] in FIG. 6, a value of the target acceleration to be set in the single pedal mode is smaller than that of the target acceleration to be set in normal pedal mode.

That is, comparing the normal pedal mode with the single pedal mode, in the single pedal mode, the target acceleration to be set under the same depression amount is relatively small, and thus an acceleration to be given to the vehicle 1 is relatively small. Here, when an acceleration to be given to the vehicle 1 is relatively large, the rear portion of the vehicle 1 is sunk due to an inertial force acting on the vehicle 1, and thereby the suspension 3 supporting the front road wheels 2a as steerable road wheels is relatively stretched. On the other hand, when the acceleration is relatively large, the sinking of the rear portion of the vehicle 1 is reduced, and thereby the suspension 3 supporting the front road wheels 2a is relatively compressed. Thus, in the single pedal mode in which the acceleration is relatively small under the same depression amount, a load acting on the front wheels 2a is relatively large, and thereby the suspension 3 is relatively compressed. In a state in which the suspension 3 is relatively compressed, sinking of the front portion of the vehicle 1 to be caused by adding the incremental torque becomes relatively small, leading to deterioration in the effect of improving the responsiveness and linear feeling of the behavior of the vehicle 1 by the incremental torque. As above, in the single pedal mode, the effect of improving the responsiveness and linear feeling of the behavior of the vehicle 1 is deteriorated under the same incremental torque.

In order to correct such a deterioration in the above improvement effect, the single pedal mode coefficient K1 is set to a given value of greater than 1. In this way, under the same accelerator pedal depression amount, the incremental torque is set to a larger value when the single pedal mode as a second pedal mode is selected than when the normal pedal mode as a first pedal mode is selected. This makes it possible to obtain the effect of improving the responsiveness and linear feeling of the behavior of the vehicle 1, even in the single pedal mode.

Next, with reference to FIG. 7, the pedal depression amount coefficient K2 will be described. As depicted in FIG. 7, the pedal depression amount coefficient K2 is set such that the value thereof increases along with a decrease in the depression amount. Specifically, generally, when the accelerator pedal depression amount is relatively small, the target acceleration is set to a relatively small value, and thereby the acceleration of the vehicle 1 becomes relatively small. As mentioned above, in the state in which the acceleration of the vehicle 1 is relatively large, a load on the rear road wheels is relatively large due to an inertial force acting on the vehicle 1, and thus a load on the front road wheels becomes relatively small. On the other hand, when the accelerator pedal depression amount is relatively small, and thereby the acceleration of the vehicle 1 is relatively small, the load on the front road wheels becomes relatively large and thereby the suspension 3 of the front road wheels is relatively compressed. Therefore, in the state in which the acceleration of the vehicle 1 is relatively small, the effect of improving the responsiveness and linear feeling of the behavior of the vehicle 1 is deteriorated under the same incremental torque. In order to correct such a deterioration in the improvement effect, the pedal depression amount coefficient K2 is set such that the value thereof increases along with a decrease in the depression amount. Thus, it becomes possible to suppress the deterioration in the responsiveness and linear feeling improvement effect.

Next, with reference to FIG. 8, the pedal depression speed coefficient K3 will be described. The pedal depression speed coefficient K3 is a coefficient to be set during depression of the accelerator pedal (during increase of the depression amount). Thus, when the depression speed is zero, or the accelerator pedal is being returned (the depression amount is decreasing), the pedal depression speed coefficient K3 is set to 1. As depicted in FIG. 8, the pedal depression speed coefficient K3 is set such that the value thereof decreases along with an increase in a manipulation speed during depression of the accelerator pedal (pedal depression speed [mm/sec]). Specifically, generally, when the accelerator pedal depression speed is relatively large, the vehicle 1 is quickly accelerated, and the acceleration of the vehicle 1 becomes relatively large. As mentioned above, in the state in which the acceleration of the vehicle 1 is relatively large, the load on the rear road wheels is relatively large due to the inertial force acting on the vehicle 1, and thus the load on the front road wheels becomes relatively small. As a result, when the accelerator pedal depression speed is relatively large, the suspension 3 of the front road wheels is relatively stretched. Therefore, when the accelerator pedal depression speed is relatively large, the responsiveness of the behavior of the vehicle 1 is likely to become excessive under the same incremental torque. In order to correct such an excessive responsiveness, the pedal depression speed coefficient K3 is set such that the value thereof decreases along with an increase in the pedal depression speed.

Next, with reference to FIG. 9, the pedal return speed coefficient K4 will be described. The pedal return speed coefficient K4 is a coefficient to be set during return of the accelerator pedal (during decrease of the depression amount). Thus, when the depression speed is zero, or the accelerator pedal is being depressed (the depression amount is increasing), the pedal return speed coefficient K4 is set to 1. As depicted in FIG. 9, the pedal return speed coefficient K4 is set such that the value thereof increases along with an increase in a manipulation speed during return of the accelerator pedal (pedal return speed [mm/sec]). Specifically, generally, when the accelerator pedal depression speed is relatively large, the vehicle 1 is quickly decelerated, and the deceleration of the vehicle 1 becomes relatively large. In a state in which the deceleration of the vehicle 1 is relatively large, the load on the front road wheels is relatively large due to an inertial force acting on the vehicle 1. As a result, when the accelerator pedal return speed is relatively large, the suspension 3 of the front road wheels is relatively compressed. Therefore, when the accelerator pedal return speed is relatively large, the effect of improving the responsiveness and linear feeling of the behavior of the vehicle 1 under the same incremental torque is deteriorated. In order to correct such a deterioration in in the responsiveness and linear feeling improvement effect, the pedal return speed coefficient K4 is set such that the value thereof increases along with an increase in the pedal return speed.

In the step S27 illustrated in FIG. 4, the incremental torque setting part 18 operates to correct the incremental torque set in the step S25 by multiplying this incremental torque by the single pedal mode coefficient K1, the pedal depression amount coefficient K2, the pedal depression speed coefficient K3 and the pedal return speed coefficient K4 each determined in the above manner. After completion of the processing in the step S27, one cycle of the processing subroutine according to the flowchart in FIG. 4 is completed. After completion of the flowchart in FIG. 4, the processing is returned to the step S5 in the flowchart as the main routine depicted in FIG. 3. As mentioned above, in the step S5 illustrated in FIG. 3, the incremental torque determined in the torque addition/subtraction amount setting processing subroutine (FIG. 4) is added to the basic torque to determine the final target torque, and the engine is controlled to generate this final target torque (step S6 and S7).

On the other hand, in the step S22 illustrated in FIG. 4, when the steering angle is determined to be decreasing, the subroutine proceeds to step S28. In the step S28, the PCM 14 operates to determine whether or not the steering speed is equal to or greater than the given value. Specifically, the PCM 14 operates to determine whether or not the steering speed is equal to or greater than the given threshold $T_{S1}$. When the steering speed is determined not to be equal to or greater than the given threshold $T_{S1}$, the PCM 14 completes one cycle of the processing subroutine according to the flowchart in FIG. 4, and returns the processing to the main routine depicted in FIG. 3.

In the step S28, when the steering speed is determined to be equal to or greater than the given value, the subroutine proceeds to step S29. Specifically, when the driver turns back the steering wheel 6, the processings in step S29 and the subsequent steps will be executed. In the processings in step S29 and the subsequent steps, as the decremental torque setting step, a subtraction amount of an output torque of the engine 4 (decremental torque) necessary to add a deceleration to the vehicle 1 is set by the decremental torque setting part 20.

In the step S29, the decremental torque setting part 20 first operates to acquire a target additional deceleration based on the steering speed. This target additional deceleration is a deceleration to be added to the vehicle 1 according to the steering manipulation, with a view to accurately realizing vehicle behavior intended by the driver, during the turning-back of the steering wheel 6.

Figure 10:
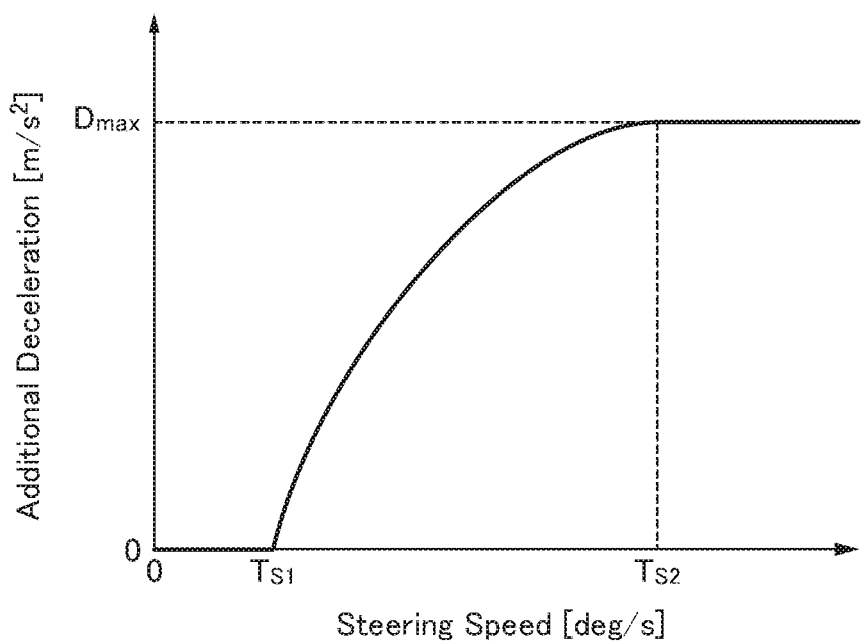
FIG. 10 is a map representing a relationship between a steering speed and a target additional deceleration to be determined by the PCM in this embodiment.

Specifically, using an additional deceleration map depicted in FIG. 10, the decremental torque setting part 20 operates to set, as the target additional deceleration, a value of the additional deceleration corresponding to the steering speed calculated in step S28.

In FIG. 10, the horizontal axis represents the steering speed, and the vertical axis represents the additional deceleration. As depicted in FIG. 10, when the steering speed is less than the threshold $T_{S1}$, a corresponding value of the additional deceleration is 0. That is, when the steering speed is less than the threshold $T_{S1}$, the PCM 14 operates to avoid performing control of adding a deceleration to the vehicle 1 in accordance with the steering manipulation (to return the processing to the main routine without setting the decremental torque).

On the other hand, when the steering speed is equal to or greater than the threshold $T_{S1}$, a value of the additional deceleration corresponding to this steering speed gradually comes closer to a given upper limit value $D_{max}$. That is, as the steering speed becomes higher, the additional deceleration becomes larger, and an increase rate of the additional deceleration becomes smaller. This upper limit value $D_{max}$ is set at a level (e.g., 0.5 m/s$^2$≈0.05 G) that a driver does not feel control intervention even when the deceleration is added to the vehicle 1 in response to the steering manipulation. Further, when the steering speed is equal to or greater than a threshold $T_{S2}$ greater than the threshold $T_{S1}$, the additional deceleration is maintained at the upper limit value $D_{max}$.

Subsequently, in step S30, the decremental torque setting part 20 operates to set the decremental torque which is a torque subtraction amount necessary to realize the target additional deceleration acquired in the step S29.

Subsequently, in step S31, as the mode selection step, the PCM 14 operates to determine whether or not the mode selector 13 provided in the vehicle 1 is set to the single pedal mode. When the mode selector 13 is determined to be set to the single pedal mode, the subroutine proceeds to step S32. On the other hand, when the mode selector 13 is determined to be set to the normal pedal mode, the PCM 14 completes one cycle of the processing subroutine according to the flowchart in FIG. 4, and returns the processing to the main routine. That is, when the mode selector 13 is set to the normal pedal mode, the final target torque is calculated by subtracting, in the step S5 illustrated in FIG. 3, the decremental torque set in the step S30 from the basic torque without correcting the decremental torque.

In the step S32, the decremental torque set in the step S30 is corrected by being multiplied by the single pedal mode coefficient k1, the pedal depression amount coefficient K2, the pedal depression speed coefficient K3 and the pedal return speed coefficient K4. The settings of the single pedal mode coefficient k1, the pedal depression amount coefficient K2, the pedal depression speed coefficient K3 and the pedal return speed coefficient K4 in the step S32 are the same as the settings of these coefficients in the step S27, and therefore description thereof will be omitted. As a result of subjecting the decremental torque to the above correction, in the decremental torque setting step, the decremental torque is set to different values between when the normal pedal mode is selected by the mode selector 13 and when the single pedal mode is selected by the mode selector 13. Further, the single pedal mode coefficient K1 is set to a value of greater than 1, so that the decremental torque is set to a larger value when the single pedal mode is selected than when the normal pedal mode is selected.

Here, with regard to a specific value of each of the single pedal mode coefficient k1, the pedal depression amount coefficient K2, the pedal depression speed coefficient K3 and the pedal return speed coefficient K4, a value to be used during turning of the steering wheel in the step S27 and a value to be used during turning-back of the steering wheel in the step S32 may be set differently.

The decremental torque setting part 20 of the PCM 14 operates to multiply the decremental torque set in the step S30 by the determined values of the single pedal mode coefficient k1, the pedal depression amount coefficient K2, the pedal depression speed coefficient K3 and the pedal return speed coefficient K4 to correct the decremental torque, and then PCM 14 completes one cycle of the engine control processing routine according to the flowchart depicted in FIG. 4. After completion of the flowchart in FIG. 4, the processing is returned to the step S5 in the flowchart as the main routine depicted in FIG. 3. In the step S5 illustrated in FIG. 3, the decremental torque determined in the torque addition/subtraction amount setting processing subroutine (FIG. 4) is subtracted from the basic torque to determine the final target torque, and the engine is controlled to generate this final target torque (step S6 and S7). The step of controlling the engine 4 to generate a torque which is determined by subtracting the decremental torque from the basic torque serves as a second torque generation step.

Next, with reference to FIG. 11, an operation of the vehicle control system according to this embodiment will be described.

FIG. 11 is a diagram of time charts showing one example of operation of the vehicle control system according to this embodiment, and representing, in order from top to bottom, the steering angle [deg] of the steering device, the steering speed [deg/sec], the basic torque [N·m], the target additional acceleration/deceleration [m/sec$^2$], the incremental/decremental torque [N·m], and generation/regeneration torque [N·m] by the motor-generator 9a, respectively. In FIG. 11, a temporal change under the condition that the mode selector 13 provided in the vehicle 1 is set to the normal pedal mode as a first pedal mode, and a temporal change under the condition that the mode selector 13 provided in the vehicle 1 is set to the single pedal mode as a second pedal mode, are indicated, respectively, by the one-dot chain line and the two-dot chain line.

First of all, the operation under the condition that the mode selector 13 is set to the normal pedal mode will be described.

During the period from the time $t_0$ to the time $t_1$ in FIG. 11, a driver of the vehicle 1 does not perform any steering manipulation, so that the steering angle is kept at 0 [deg] (neutral position) and thus the steering speed is also kept at 0 [deg/sec]. Further, during the period from the time $t_0$ to the time $t_1$, the driving state of the vehicle 1 (e.g., the accelerator pedal depression amount) is also constant, and thus the basis torque [N·m] is also kept at a constant value. In this state, in the flowchart depicted in FIG. 4, the process of the step S21→the step S22→Return is repeated, so that the settings of the target additional acceleration/deceleration, the incremental torque and the decremental torque are not performed (the target additional acceleration/deceleration=0, the incremental torque=0, and the decremental torque=0). Therefore, during the period from the time $t_0$ to the time $t_1$, the basic torque (constant value) is determined as the final target torque (step S5 in FIG. 3). Further, in this embodiment, during the period from the time $t_0$ to the time $t_1$ during which the incremental torque is 0, torque generation or torque regeneration by the motor-generator 9a is not performed.

Subsequently, when the driver starts the turning manipulation of the steering wheel 6 at the time $t_1$ in FIG. 11, (the absolute values of) the steering angle and the steering speed start to increase. In the flowchart depicted in FIG. 4, when the steering speed becomes equal to or greater than the threshold $T_{S1}$, the process of the step S21→the step S23→the step S24→the step S25→the step S26→Return is repeated to repeatedly perform the settings of the target additional acceleration and the incremental torque. That is, in the step S24 illustrated in FIG. 4, the target additional acceleration is set using the map depicted in FIG. 5, and, in the step S25, a value of the incremental torque necessary to realize the target additional acceleration is calculated. Here, in the example depicted in FIG. 11, during the period from the time $t_1$ to time $t_2$, the driving manipulation such as depression of the accelerator pedal is not performed, so that the basis torque is kept at constant value (is not changed from the value during the period from the time $t_0$ to the time $t_1$).

Further, under the condition that the mode selector 13 is set to the normal pedal mode, "NO" is selected in the step S26, and one cycle of the processing subroutine according to the flowchart depicted in FIG. 4 is completed without executing the correction processing in the step S27. That is, when the normal pedal mode is selected, the incremental torque set in the step S25 is directly added to the basis torque without being subjected to the correction in the step S27. The operation under the condition that the single pedal mode is selected will be described later.

Thus, during the period from the time $t_1$ to time $t_2$, the incremental torque is set to a value corresponding to the target additional acceleration, and the final target torque is set to a value determined by adding the incremental torque to the basic torque (constant value). Then, in order to generate the final target torque which is determined by adding the incremental torque to the basic torque, the actuator control variables set in the step S6 illustrated in FIG. 3 are used. Specifically, in this embodiment, the motor-generator 9a is controlled to generate a torque corresponding to the incremental torque, as depicted in the bottom of FIG. 11. Alternatively, the ignition timing of the spark plug 5c of the engine 4 may be advanced with respect to a point for generating the basic torque, so as to increase the basic torque by the incremental torque.

An increase in torque based on addition of the additional torque starts within about 50 msec after the steering speed reaches $T_{S1}$ (after execution of the processing in the step S24 is started in the flowchart in FIG. 4), and then reaches a maximum value after about 200 to 250 msec. In response to a rise in the driving torque for rear road wheels 2b based on this incremental torque, a force is instantaneously transmitted from the rear road wheels to the vehicle body via the suspension 3 such that it causes the vehicle 1 to be tilted forwardly (causes the front portion of the vehicle to be sunk), and the load on the front road wheels 2a as steerable road wheels are increased. This instantaneously-rising load on the front road wheels 2a improves the responsiveness and linear feeling of vehicle behavior with respect to the steering manipulation.

On the other hand, due to an increase in the driving torque for rear road wheels 2b based on the incremental torque, the vehicle 1 is accelerated, and this acceleration generates a force causing the vehicle 1 to be tilted rearwardly (causing the rear portion of the vehicle 1 to be sunk). However, there is a certain level of time lag between the time when the driving torque starts to increase and the time when the resulting acceleration of the vehicle 1 causes the vehicle 1 to be substantially tilted rearwardly. Thus, the decrease in load on the front wheels 2a based on the acceleration of the vehicle 1 has a small influence on the responsiveness and linear feeling of vehicle behavior with respect to the steering manipulation.

Subsequently, when the turning manipulation is shifted to a steered position-holding state at the time $t_2$ in FIG. 11, the steering angle becomes a constant value. During the period from the time $t_2$ to time $t_3$, in the flowchart depicted in FIG. 4, the process of the step S21→the step S22→Return is repeated. Here, in the example depicted in FIG. 11, during the period from the time $t_2$ to the time $t_3$, the driving manipulation such as depression of the accelerator pedal is not performed, so that the basis torque is kept at constant value (is not changed from the value during the period from the time $t_0$ to the time $t_1$). Thus, during the period from the time $t_2$ to the time $t_3$, the steering speed is zero, and thus the target additional acceleration/deceleration is also set to zero. Accordingly, during the period from the time $t_2$ to the time $t_3$, the generation/regeneration torque by the motor-generator 9a is set to zero.

Subsequently, when the driver starts the turning-back manipulation of the steering wheel 6 at the time $t_3$ in FIG. 11, (the absolute values of) the steering angle and the steering speed start to decrease, and, in the flowchart depicted in FIG. 4, the process of the step S21→the step S22→the step S28→the step S29→the step S30→the step S31→Return is repeated. In this state, along with the decrease in the steering angle, the target additional deceleration is sequentially set in the step S29. Thus, during the period from the time $t_3$ to time $t_4$, the decremental torque is set to a value for realizing the target additional deceleration set in the step S29. Here, in the example depicted in FIG. 11, during the period from the time $t_3$ to the time $t_4$, the driving manipulation such as depression of the accelerator pedal is not performed, so that the basis torque is kept at constant value, and the final target torque is set to a value which is determined by subtracting the decremental torque from the basis torque (constant value).

Further, under the condition that the mode selector 13 is set to the normal pedal mode, "NO" is selected in the step S31, and one cycle of the processing subroutine according to the flowchart depicted in FIG. 4 is completed without executing the correction processing in the step S32. That is, when the normal pedal mode is selected, the decremental torque set in the step S30 is directly subtracted from the basis torque without being subjected to the correction in the step S32.

Thus, during the period from the time $t_3$ to time $t_4$, the decremental torque is set to a value corresponding to the target additional deceleration, and the final target torque is set to a value determined by subtracting the decremental torque from the basic torque (constant value). Then, in order to generate the final target torque which is determined by subtracting the decremental torque from the basic torque, the actuator control variables set in the step S6 illustrated in FIG. 3 are used. Specifically, in this embodiment, the motor-generator 9a is controlled to regenerate a torque corresponding to the decremental torque, as depicted in the bottom of FIG. 11. Alternatively, the ignition timing of the spark plug 5c of the engine 4 may be retarded with respect to a point for generating the basic torque, so as to reduce the basic torque by the incremental torque.

Subsequently, when the steering angle is returned to 0 and held at 0 (steering speed=0) at time $t_4$ in FIG. 11, the process of the step S21→the step S22→Return is repeated. Since the steering speed becomes zero, the target additional acceleration/deceleration is also becomes zero, and the value of the basis torque is determined as the final target torque.

On the other hand, under the condition that the single pedal mode as a second pedal mode is selected by the mode selector 13, in the step S27 illustrated in FIG. 4, the incremental torque is corrected. Specifically, when the single pedal mode is selected, during the period from the time $t_1$ to time $t_2$, the subroutine proceeds from the step S26 to the step S27 in FIG. 4, and the correction is executed in the step S27. Specifically, in the step S27, the incremental torque set in the step S25 is corrected by being multiplied by the single pedal mode coefficient K1, the pedal depression amount coefficient K2, the pedal depression speed coefficient K3, and the pedal return speed coefficient K4.

Here, in the example depicted in FIG. 11, the accelerator depression amount is constant (pedal depression speed=0), and thus each of the pedal depression speed coefficient K3 and the pedal return speed coefficient K4 is set to 1, so that the value of the incremental torque is not changed by being multiplied by these two coefficients. On the other hand, when the accelerator pedal is being depressed or returned, the pedal depression speed coefficient K3 or the pedal return speed coefficient K4 is set to a value other than 1, i.e., a value corresponding to the depression or return speed, to execute the correction according to the pedal depression return speed.

In the time chart representing the incremental torque and the decremental torque in FIG. 11, a temporal change (during the time t, to the time $t_2$) under the condition that the correction of the incremental torque is performed in the step S27 is indicated by the two-dot chain line. In the operation exhibiting the temporal change indicated by the two-dot chain line in FIG. 11, the mode selector 13 of the vehicle 1 is set in the single pedal mode, and thus the single pedal mode coefficient K1 is set to a given value greater than 1. Further, the pedal depression amount coefficient K2 to be set according to the accelerator depression amount is also set to a given value equal to or greater than 1. In the example depicted in FIG. 11, the incremental torque is corrected to a larger value by being multiplied by these coefficients.

Further, in the time chart representing the incremental torque and the decremental torque in FIG. 11, a temporal change (during the time $t_3$ to the time $t_3$) under the condition that the correction of the decremental torque is performed in the step S32 is indicated by the one-dot chain line. In the operation exhibiting the temporal change indicated by the one-dot chain line in FIG. 11, the mode selector 13 of the vehicle 1 is set in the single pedal mode, and thus the single pedal mode coefficient K1 is set to a given value greater than 1. Further, the pedal depression amount coefficient K2 to be set according to the accelerator depression amount is also set to a given value equal to or greater than 1 (each of the pedal depression speed coefficient K3 and the pedal return speed coefficient K4 is set to 1). In the example depicted in FIG. 11, the decremental torque is corrected to a larger value by being multiplied by these coefficients.

In the example depicted in FIG. 11, the basic torque is set to a constant value. However, when the basis torque is changed due to manipulation of the accelerator pedal or the like by the driver, the incremental torque or the decremental torque is added to or subtracted from the basis torque. Further, when the accelerator pedal is manipulated, each of the pedal depression speed coefficient K3 and the pedal return speed coefficient K4 is set according to the depression or return speed of the accelerator pedal, and the incremental or decremental torque is also corrected by the set values of these coefficients.

As above, in the vehicle control system and method according to the above embodiment, the incremental torque is set to allow the basic torque to be increased in accordance with the increase in the steering angle of the steering device 7 equipped in the vehicle 1, so that it becomes possible to increase the load on the front road wheels in accordance with the increase in the steering angle, thereby improving the responsiveness and linear feeling of vehicle behavior with respect to the steering operation. In the above embodiment, the incremental torque is set to different values between when the normal pedal mode is selected and when the single pedal mode is selected (during the time $t_1$ to the time $t_2$). Thus, the incremental torque can be adequately set in both the normal pedal mode and the single pedal mode.

In the vehicle control system and method according to the above embodiment, the incremental torque is to a larger value when the single pedal mode is selected than when the normal pedal mode is selected, so that it becomes possible to sufficiently obtain the effect of improving the responsiveness and linear feeling of the vehicle behavior by adding the incremental torque, even in the single pedal mode.

In the vehicle control system and method according to the above embodiment, the incremental torque is set to a larger value when the depression amount of the accelerator pedal of the vehicle 1 is relatively small than when the depression amount of the accelerator pedal is relatively large (FIG. 7), so that it becomes possible to sufficiently improve the responsiveness and linear feeling of the vehicle behavior, even when the depression amount is relatively small.

In the vehicle control system and method according to the above embodiment, the incremental torque is set to a smaller value when the manipulation speed during depression of the accelerator pedal is relatively large than when the manipulation speed during depression of the accelerator pedal is relatively small (FIG. 8), so that it becomes possible to prevent cornering performance of the vehicle from becoming excessive even when the accelerator pedal is depressed at a relatively large manipulation speed.

In the vehicle control system and method according to the above embodiment, the incremental torque is set to a larger value when the manipulation speed during return of the accelerator pedal is relatively large than when the manipulation speed during return of the accelerator pedal is relatively small (FIG. 9), so that it becomes possible to sufficiently improve the responsiveness and linear feeling of the vehicle behavior even when the manipulation speed during return of the accelerator pedal is relatively large.

In the vehicle control system and method according to the above embodiment, the decremental torque is set to different values between when the normal pedal mode is selected and when the single pedal mode is selected (during the time $t_3$ to the time $t_4$). Thus, the decremental torque can be adequately set in both the normal pedal mode and the single pedal mode.

In the vehicle control system and method according to the above embodiment, the decremental torque is set to a larger value when the single pedal mode is selected than when the normal pedal mode is selected, so that it becomes possible to sufficiently obtain the effect of improving the responsiveness and linear feeling of the vehicle behavior by subtracting the decremental torque, even in the single pedal mode.

Although the present invention has been described based on a preferred embodiment thereof, it is to be understood that various changes and modifications may be made therein, in particular, although the above embodiment have been described based on an example where the present invention is applied to a vehicle equipped with a gasoline engine, the present invention can also be applied to a vehicle equipped with any of various other prime mover such as an electric motor.

LIST OF REFERENCE SIGNS

1: vehicle
2a: front road wheel (steerable road wheel)
2b: rear road wheel (drive road wheel)
3: suspension
4: engine (prime mover)
5a: throttle valve
5b: injector 5c: spark plug
5d: variable valve mechanism
6: steering wheel
7: steering device
8: steering angle sensor
9a: motor-generator
9b: inverter
9c: battery
10: accelerator position sensor (driving state sensor
12: vehicle speed sensor
13: mode selector
14: PCM (controller)
16: basic torque setting part
18: incremental torque setting part
20: decremental torque setting part]
22: engine control part

The invention claimed is:

1. A method of controlling a vehicle in which rear road wheels are driven by a prime mover, comprising:
a mode selection step of selecting a first pedal mode in which an acceleration of the vehicle is set based on a depression amount of an accelerator pedal of the vehicle, or a second pedal mode in which the acceleration and a deceleration of the vehicle are set based on the depression amount of the accelerator pedal of the vehicle;
a basic torque setting step of setting, based on a driving state of the vehicle, a basic torque to be generated by the prime mover;
an incremental torque setting step of setting an incremental torque to allow the basic torque to be increased in accordance with an increase in steering angle of a steering device equipped in the vehicle; and
a torque generation step of controlling the prime mover to generate a torque which is determined by adding the incremental torque to the basic torque,
wherein the incremental torque setting step includes setting the incremental torque to different values between when the first pedal mode is selected in the mode selection step and when the second pedal mode is selected in the mode selection step.

2. The method as recited in claim 1, wherein the incremental torque setting step includes setting the incremental torque to a larger value when the second pedal mode is selected in the mode selection step than when the first pedal mode is selected in the mode selection step.

3. The method as recited in claim 1, wherein the incremental torque setting step includes, under a condition that the second pedal mode is selected in the mode selection step, setting the incremental torque to a larger value when the depression amount of the accelerator pedal of the vehicle is smaller than when the depression amount of the accelerator pedal of the vehicle is larger.

4. The method as recited in claim 1, wherein the incremental torque setting step includes, under a condition that the second pedal mode is selected in the mode selection step, setting the incremental torque to a smaller value when a manipulation speed during depression of the accelerator pedal of the vehicle is larger than when the manipulation speed during depression of the accelerator pedal of the vehicle is smaller.

5. The method as recited in claim 1, wherein the incremental torque setting step includes, under a condition that the second pedal mode is selected in the mode selection step, setting the incremental torque to a larger value when a manipulation speed during return of the accelerator pedal of the vehicle is larger than when the manipulation speed during return of the accelerator pedal of the vehicle is smaller.

6. The method as recited in claim 1, which further comprises:
a decremental torque setting step of setting a decremental torque to allow the basic torque to be is reduced in accordance with a decrease in the steering angle of the steering device equipped in the vehicle; and
a second torque generation step of controlling the prime mover to generate a torque which is determined by subtracting the decremental torque from the basic torque,
wherein the decremental torque setting step includes setting the decremental torque to different values between when the first pedal mode is selected in the mode selection step and when the second pedal mode is selected in the mode selection step.

7. The method as recited in claim 6, wherein the decremental torque setting step includes setting the decremental torque to a larger value when the second pedal mode is selected in the mode selection step than when the first pedal mode is selected in the mode selection step.

8. A vehicle control system for controlling a vehicle in which rear road wheels are driven by a prime mover, comprising:
a mode selector for selecting a first pedal mode in which an acceleration of the vehicle is set based on a depression amount of an accelerator pedal of the vehicle, or a second pedal mode in which the acceleration and a deceleration of the vehicle are set based on the depression amount of the accelerator pedal of the vehicle;
a driving state sensor for detecting a driving state of the vehicle;
a steering angle sensor for detecting a steering angle of a steering device equipped in the vehicle; and
a controller for controlling the prime mover based on a detection signal from the driving state sensor and a detection signal from the steering angle sensor,
wherein the controller is configured to:
set, based on the detection signal from the driving state sensor, a basic torque to be generated by the prime mover;
when an increase in the steering angle is detected by the steering angle sensor, set an incremental torque to allow the basic torque to be increased in accordance with the increase in the steering angle; and
control the prime mover to generate a torque which is determined by adding the incremental torque to the basic torque,
wherein the controller is operable to set the incremental torque to different values between when the first pedal mode is selected by the mode selector and when the second pedal mode is selected by the mode selector.

* * * * *